United States Patent
Yu et al.

(10) Patent No.: US 9,686,517 B2
(45) Date of Patent: Jun. 20, 2017

(54) OPTICAL SYSTEM AND IMAGE COMPENSATING METHOD OF OPTICAL APPARATUS

(71) Applicant: Test Research, Inc., Taipei (TW)

(72) Inventors: Liang-Pin Yu, New Taipei (TW);
Chih-Tien Tsai, Taipei (TW);
Yeong-Feng Wang, Taipei (TW)

(73) Assignee: Test Research, Inc., Taipei (TW)

(*) Notice: Subject to any disclaimer, the term of this patent is extended or adjusted under 35 U.S.C. 154(b) by 193 days.

(21) Appl. No.: 14/570,258

(22) Filed: Dec. 15, 2014

(65) Prior Publication Data

US 2016/0173836 A1 Jun. 16, 2016

(51) Int. Cl.
| | |
|---|---|
| *G03B 21/14* | (2006.01) |
| *H04N 9/31* | (2006.01) |
| *G02B 13/16* | (2006.01) |
| *G02B 27/12* | (2006.01) |

(Continued)

(52) U.S. Cl.
CPC ........... *H04N 9/3105* (2013.01); *G02B 13/16* (2013.01); *G02B 26/0833* (2013.01); *G02B 27/12* (2013.01); *G03B 17/54* (2013.01); *G03B 21/142* (2013.01); *G03B 21/147* (2013.01); *H04N 9/3185* (2013.01)

(58) Field of Classification Search
CPC .... G03B 21/14; G03B 21/147; G03B 21/142; G03B 21/145; G03B 21/2026; G03B 21/2053; G03B 21/16; H04N 9/3105; H04N 5/23258; H04N 5/23287; H04N 5/2259; H04N 5/23248; H04N 9/3185; G02B 13/16; G02B 27/12; G02B 26/8033

USPC .......................... 353/69, 70; 356/2, 602, 603
See application file for complete search history.

(56) References Cited

U.S. PATENT DOCUMENTS

| | | | |
|---|---|---|---|
| 4,824,210 A * | 4/1989 | Shimazaki | ........ G02F 1/133385 348/E5.141 |
| 5,300,942 A | 4/1994 | Dolgoff | |

(Continued)

FOREIGN PATENT DOCUMENTS

| | | |
|---|---|---|
| DE | 2102649 A1 | 9/1971 |
| DE | 2411740 A1 | 10/1974 |

(Continued)

OTHER PUBLICATIONS

Japanese Office Action for Japanese Patent Application No. 2015-079908, mailed Oct. 4, 2016.

(Continued)

*Primary Examiner* — William C Dowling
(74) *Attorney, Agent, or Firm* — Merchant & Gould P.C.

(57) ABSTRACT

An optical system includes an optical apparatus. The optical apparatus is for projecting a first projection image to a plane or detecting a first detected image of the plane. The optical apparatus includes a first image device, and a lens group. The first image device has an image surface having an image center. The lens group is disposed between the first image device and the plane and has a lens axis surface and an optic center. The optic center and the image center form a connection line. The plane has a tangent surface to an intersecting point of the connection line. The lens axis surface, the tangent surface, and an extension surface of the image surface substantially intersect at a straight line.

19 Claims, 9 Drawing Sheets

(51) Int. Cl.
*G02B 26/08* (2006.01)
*G03B 17/54* (2006.01)

(56) References Cited

U.S. PATENT DOCUMENTS

| | | | | |
|---|---|---|---|---|
| 5,302,983 A | * | 4/1994 | Sato | G03B 21/132 353/69 |
| 6,761,457 B2 | * | 7/2004 | Wada | G02B 27/0927 348/E5.141 |
| 7,605,860 B2 | * | 10/2009 | Saitoh | G03B 5/06 348/345 |
| 7,880,797 B2 | * | 2/2011 | Nanjo | G02B 13/00 348/335 |
| 8,553,234 B2 | * | 10/2013 | Nemoto | G01B 11/03 356/601 |
| 9,013,711 B2 | * | 4/2015 | Keshavmurthy | G01B 11/2509 356/511 |
| 2006/0285080 A1 | * | 12/2006 | Kurihara | G03B 21/16 353/70 |
| 2007/0013875 A1 | * | 1/2007 | Matsuoka | G03B 21/142 353/70 |
| 2012/0154766 A1 | | 6/2012 | Choi et al. | |
| 2014/0028839 A1 | * | 1/2014 | Ishibashi | H04N 5/217 348/140 |
| 2015/0138383 A1 | * | 5/2015 | Kelley | G06T 5/006 348/208.6 |

FOREIGN PATENT DOCUMENTS

| | | |
|---|---|---|
| DE | 8815708 U | 6/1989 |
| DE | 19721688 A1 | 9/1998 |
| DE | 102008036275 A1 | 2/2010 |
| DE | 102011104550 A1 | 12/2012 |
| DE | 102011117523 B3 | 4/2013 |
| DE | 102013105828 A1 | 12/2013 |
| JP | 03-065879 A | 3/1991 |
| JP | 05-297341 A | 11/1993 |
| JP | 08-205061 A | 8/1996 |
| JP | 09-182092 A | 7/1997 |
| JP | 11-239358 A | 8/1999 |
| JP | 2002-031842 A | 1/2002 |
| JP | 2003-044839 A | 2/2003 |
| JP | 2005-130335 A | 5/2005 |
| JP | 2006-352514 A1 | 12/2006 |
| JP | 2007-519372 A | 7/2007 |
| JP | 2008-083415 A | 4/2008 |
| JP | 10-2010-0138149 A | 12/2010 |
| JP | 2010-538685 A | 12/2010 |
| JP | 2011-053663 A | 3/2011 |
| JP | 2014-086788 A | 5/2014 |
| KR | 10-2008-0087585 A | 10/2008 |
| KR | 10-2013-0098324 A | 9/2013 |
| TW | 200500776 A | 1/2005 |
| TW | 200835997 A | 9/2008 |
| TW | 200836000 A | 9/2008 |

OTHER PUBLICATIONS

Taiwanese Office Action for Taiwanese Patent Application No. 104102723, mailed Nov. 14, 2016.

* cited by examiner

OPTICAL SYSTEM AND IMAGE COMPENSATING METHOD OF OPTICAL APPARATUS

BACKGROUND

Field of Invention

The present invention relates to an optical system.

Description of Related Art

In general, depth of field for an optical system like a projector or a camera is narrow, and the image of the projector projected onto a plane appears sharp only within a small working distance range. Also, the camera can only detect a clear image under a rather limited working distance range. In this regard, if the projection of an image is conducted obliquely or onto a non-flat plane, portions of the image must be located outside the working distance range of the projector. Under such circumstances, it is difficult to obtain an entire sharp image, and the camera has to detect an unfocused image from the non-flat plane. Therefore, the industry is striving to provide an optical system to solve the aforementioned issues.

SUMMARY

An aspect of the present invention is to provide an optical system including at least one optical apparatus. The optical apparatus is configured for projecting a first projection image to a plane or detecting a first detected image of the plane. The optical apparatus includes a first image device and a lens group. The first image device has an image surface. The image surface has an image center. The lens group is disposed between the first image device and the plane and has a lens axis surface and an optic center. The optic center and the image center form a connection line, and the plane has a tangent surface to an intersecting point of the connection line. The lens axis surface, the tangent surface, and an extension surface of the image surface substantially intersect at a straight line.

In one or more embodiments, the optical apparatus further includes a tuning device connected to the first image device for tuning a position and a tilt angle of the first image device.

In one or more embodiments, the optical system further includes an image capturing device connected to the tuning device for capturing the first projection image on the plane.

In one or more embodiments, the first image device is configured for forming the first projection image that is projected to the plane by the lens group.

In one or more embodiments, the first image device is a digital micromirror device.

In one or more embodiments, the optical apparatus further includes a light source for providing a light beam. The first image device modulates the light beam to form the first projection image.

In one or more embodiments, the optical apparatus further includes a second image device and a beam splitter. The second image device is configured for forming a second projection image. The lens group is further for projecting the second projection image to the plane. The beam splitter is disposed between the first image device and the lens group for reflecting the second projection image formed by the second image device to the lens group and allowing the first projection image to pass therethrough.

In one or more embodiments, the optical apparatus further includes a tuning device connected to the second image device for tuning a position and a tilt angle of the second image device.

In one or more embodiments, the first image device is configured for detecting the first detected image of the plane through the lens group.

In one or more embodiments, the first image device is a photodiode array.

In one or more embodiments, the optical apparatus further includes a second image device and a beam splitter. The second image device is configured for detecting a second image of the plane through the lens group. The beam splitter is disposed between the first image device and the lens group for reflecting the second detected image from the lens group to the second image device and allowing the first detected image to pass therethrough.

In one or more embodiments, the optical apparatus further includes a tuning device connected to the second image device for tuning a position and a tilt angle of the second image device.

In one or more embodiments, a number of the projection apparatus is plural, and the first projection images or the first detected images of the optical apparatuses on the plane are separated from each other.

In one or more embodiments, a number of the projection apparatus is plural, and the first projection images or the first detected images of the optical apparatuses overlap on the plane.

Another aspect of the present invention is to provide a method for compensating image of an optical apparatus. The optical apparatus includes an image device and a lens group. The image device has an image surface having an image center. The lens group has a lens axis surface and an optic center. The optic center and the image center form a connection line. The method includes forming an image by the image device. The image is projected to a plane through the lens group. The plane has a tangent surface to an intersecting point of the connection line. The image projected on the plane is detected. The position and the tilt angle of the image device are tuned according to the detected image, such that the lens axis surface, the tangent surface, and an extension surface of the image surface substantially intersect at a straight line.

In one or more embodiments, forming the image includes providing a light beam to the image device. The light beam is modulated into the image by the image device.

In one or more embodiments, tuning the image device includes electrically tuning the position and the tilt angle of the image device.

In one or more embodiments, tuning the image device includes mechanically tuning the position and the tilt angle of the image device.

Still another aspect of the present invention is to provide a method for compensating image of an optical apparatus. The optical apparatus includes an image device and a lens group. The image device has an image surface having an image center. The lens group has a lens axis surface and an optic center. The optic center and the image center form a connection line. The method includes detecting an image of a plane through the lens group by the image device. The plane has a tangent surface to an intersecting point of the connection line. The position and the tilt angle of the image device are tuned according to the detected image, such that the lens axis surface, the tangent surface, and an extension surface of the image surface substantially intersect at a straight line.

In one or more embodiments, tuning the image device includes electrically tuning the position and the tilt angle of the image device.

In one or more embodiments, tuning the image device includes mechanically tuning the position and the tilt angle of the image device.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
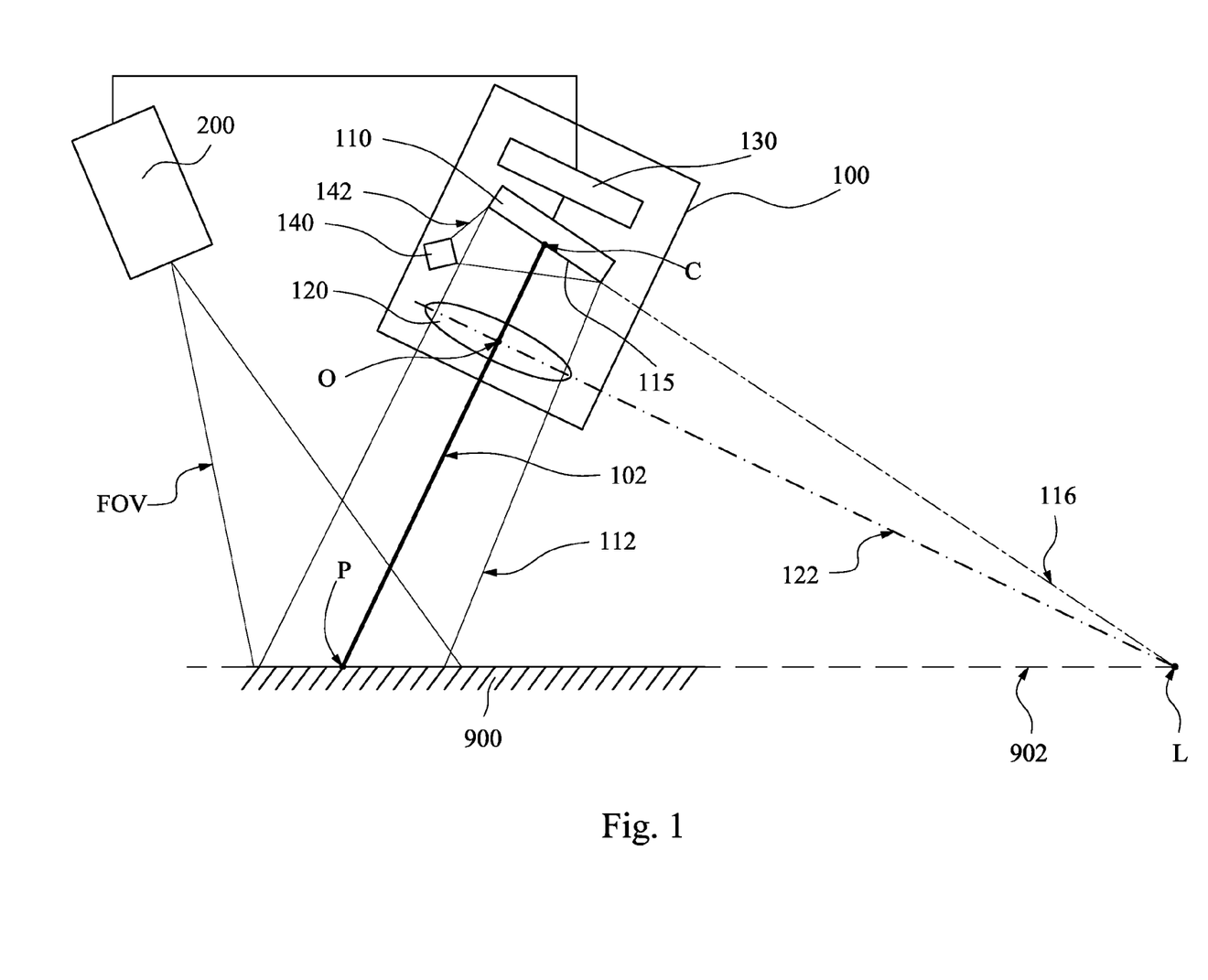
FIG. 1 is a schematic diagram of an optical system and a plane according to a first embodiment of the present invention.
Figure 2:
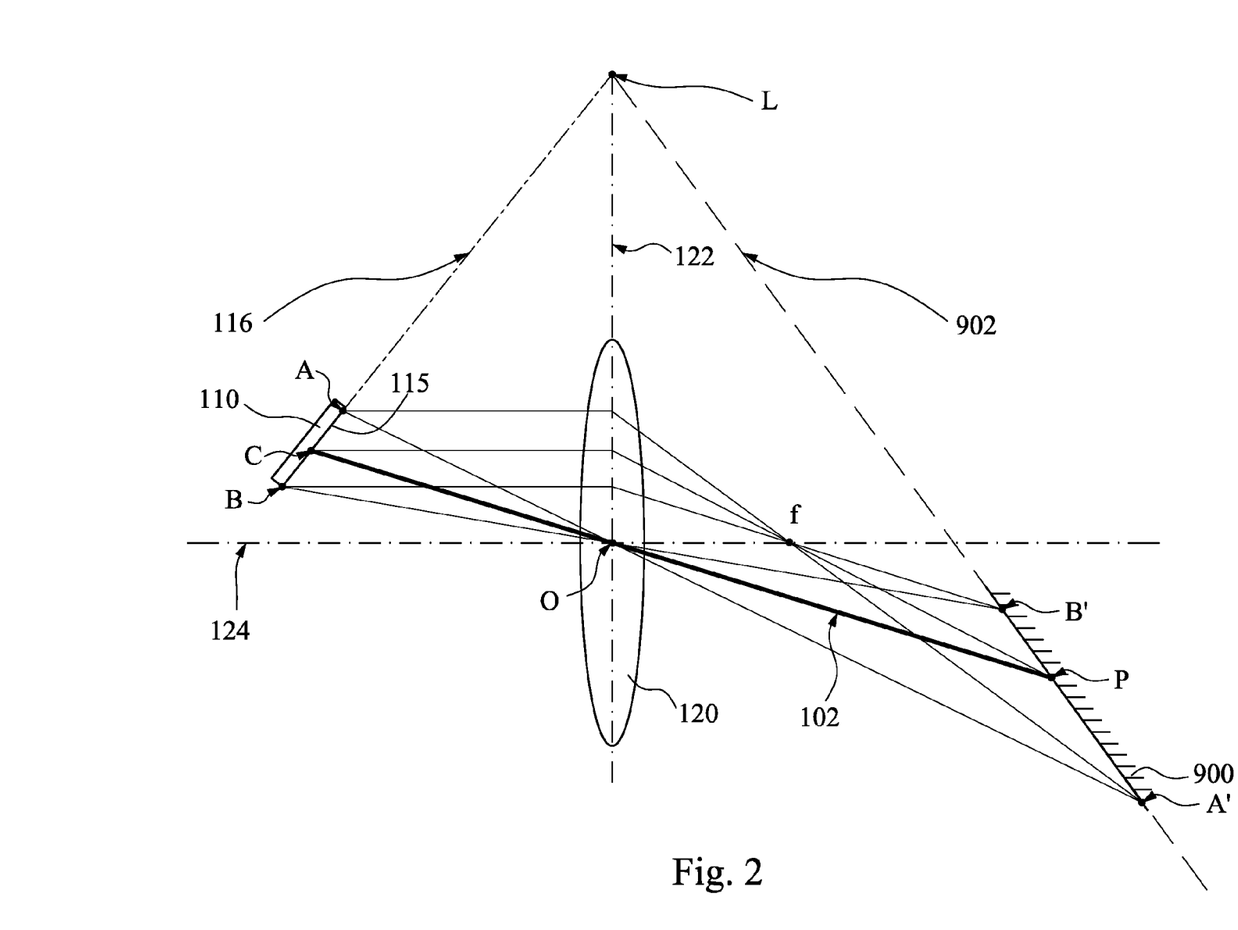
FIG. 2 is a light path schematic diagram of a first image device0, a lens group, and the plane of FIG. 1.

FIG. 1 is a schematic diagram of an optical system and a plane 900 according to a first embodiment of the present invention, and FIG. 2 is a light path schematic diagram of a first image device 110, a lens group 120, and the plane 900 of FIG. 1. The optical system includes at least one optical apparatus 100. For example, the optical system in FIG. 1 includes one optical apparatus 100. The optical apparatus 100 is configured for projecting a first projection image 112 to the plane 900. The optical apparatus 100 includes a first image device 110 and a lens group 120. The first image device 110 has an image surface 115. The image surface 115 has an image center C. The lens group 120 is disposed between the first image device 110 and the plane 900 and has a lens axis surface 122 and an optic center O. The optic center O and the image center C form a connection line 102. The plane 900 has a tangent surface 902 to an intersecting point P of the connection line 102. The lens axis surface 122, the tangent surface 902, and an extension surface 116 of the image surface 115 substantially intersect at a straight line L.

In this embodiment, the image center C is a centroid of the image surface 115. The lens group 120 may includes one or a plurality of lenses. For the lens group 120 including one lens, the lens axis surface 122 of the lens group 120 is a virtual center surface between two main curved surfaces of the lens, and the optic center O is an intersecting point of the lens axis surface 122 and the optical axis 124 of the lens group 120. For the lens group 120 including a plurality of lenses, the lenses can be equivalent to an equivalent lens, and the lens axis surface 122 is a virtual center surface between two main curved surfaces of the equivalent lens, and the optic center O is an intersecting point of the lens axis surface 122 and the optical axis 124 of the lens group 120. The plane 900 in this embodiment can be an inclined plane, a plane with a curved or rough surface, etc. Since the plane 900 in this embodiment has an inclined flat top surface, the tangent surface 156 is substantially equal to the top surface of the plane 900.

In this embodiment, the optical apparatus 100 is a projector. The first image device 110 can be a light modulator for forming the first projection image 112, and the lens group 120 projects the first projection image 112 to the plane 900. That is, the first image device 110 is disposed at the object side of the lens group 120, and the plane 900 is located at the image side of the lens group 120. The image center C of the image surface 115 images at the intersecting point P of the plane 900.

Briefly, the optical apparatus 100 of this embodiment provides a clear projection image on the plane 900. As shown in FIG. 2, the lens axis surface 122, the tangent surface 902, and the extension surface 116 substantially intersect at the straight line L. With this configuration, all pixels of the first projection image 112 focus on the tangent surface 902, where mark f represents the focus point of the lens group 120. For example, the pixel A of the first projection image 112 focuses at the point A' of the tangent surface 156, the pixel B of the first projection image 112 focuses at the point B' of the tangent surface 156, and the pixel at the image center C focuses at the intersecting point P of the tangent surface 902. Hence, all of the pixels (no matter the pixel at the image center C or the edge pixels A and B) of the of the first projection image 112 are focused on the tangent surface 156, i.e., the top surface of the plane 900 in this embodiment, resulting in a clear projection image on the plane 900.

Reference is made to FIG. 1. In this embodiment, the optical apparatus 100 can further include a light source 140 for providing a light beam 142. The first image device 110, such as a digital micromirror device (DMD), modulates the light beam 142 to form the first projection image 112. The light source 140 may be a light emitting diode, a lamp, or an illumination device, and the claimed scope is not limited in this respect.

In this embodiment, the optical apparatus 100 can further include a tuning device 130 connected to the first image device 110 for tuning a position and a tilt angle of the first image device 110. However, the tuning device 130 can be omitted if the default configuration of the lens axis surface 122, the tangent surface 902, and the extension surface 116 substantially intersect at the straight line L. The tuning device 130 can be manually or automatically operated. In some embodiments, the tuning device 130 can be a tuning mechanism, such as a focusing mechanism, and the position and the tilt angle of the first image device 110 can be mechanically tuned. In another embodiments, the tuning device 130 can be an electric device, such as a piezoelectricity mechanism. Therefore, the position and the tilt angle of the first image device 110 can be electrically tuned.

The optical system can further include an image capturing device 200. The image capturing device 200 is connected to the tuning device 130 for capturing the first projecting image 112 on the plane 900. After analyzing the captured image, the image capturing device 200 can send order to the tuning device 130, and the position and the tilt angle of the first image device 110 are tuned accordingly. The image capturing device 200 may be a camera whose field of view FOV covers the first projection image 112 on the plane 900.

Figure 3:
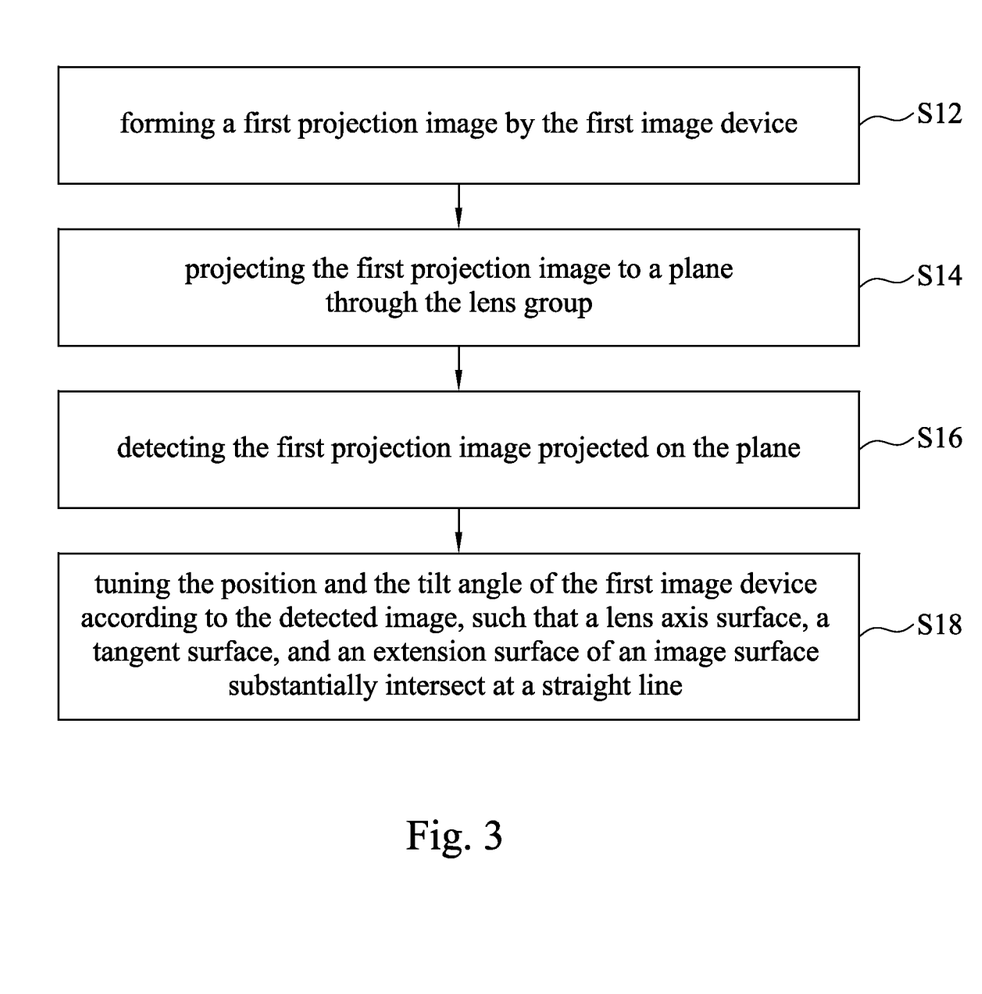
FIG. 3 is a flow chart of the method for compensating image according to one embodiment of the present invention.

To get a clear projection image on the plane 900, a method for compensating image of the optical apparatus 100 can be applied. FIG. 3 is a flow chart of the method for compensating image according to one embodiment of the present invention. To facilitate a clear description of the image compensating method, the image compensating method is applied to, but should not be limited to, the optical apparatus 100 of FIG. 1. As shown in act S12, the first projection image 112 is formed by the first image device 110. For example, the light source 140 provides the light beam 142 to the first image device 110, and the first image device 110 modulates the light beam 142 into the first projection image 112.

Subsequently, as shown in act S14, the first projecting image 112 is projected to the plane 900 through the lens group 120. At this act, the lens axis surface 122, the tangent surface 902, and the extension surface 116 may not intersect at the straight line L, such that the first projecting image 112 projected on the plane 900 is unfocused.

To get a clear projection image on the plane 900, the first projection image 112 projected on the plane 900 is detected, as shown in act S16. For example, the first projection image 112 is detected by human eyes or the aforementioned image capturing device 200. Taking the image capturing device 200 as an example, the image capturing device 200 can detect (capture) and analyze the first projected image 112 on the plane 900 to figure out if the first projection image 112 is focused on the plane 900.

Then, as shown in act S18, the position and the tilt angle of the first image device 110 is tuned according to the detected first projection image 112, such that the lens axis surface 122, the tangent surface 902, and the extension surface 116 substantially intersect at the straight line L. In some embodiments, the first image device 110 is mechanically tuned if the tuning device 130 is a focusing mechanism. For example, a user can manually rotate the focusing mechanism to tune the first image device 110. In some embodiments, the first image device 110 is electrically tuned if the tuning device 130 is an electric device. For example, the image capturing device 200 can send order to the tuning device 130 to tune the first image device 110.

In conclusion, by tuning the position and the tilt angle of the first image device 110, the lens axis surface 122, the tangent surface 902, and the extension surface 116 of the image surface 115 substantially intersect at the straight line L. Therefore, all of the pixels of the first projection image 112 can focus on the tangent surface 902 of the plane 900, resulting in a clear image on the plane 900.

Figure 4:
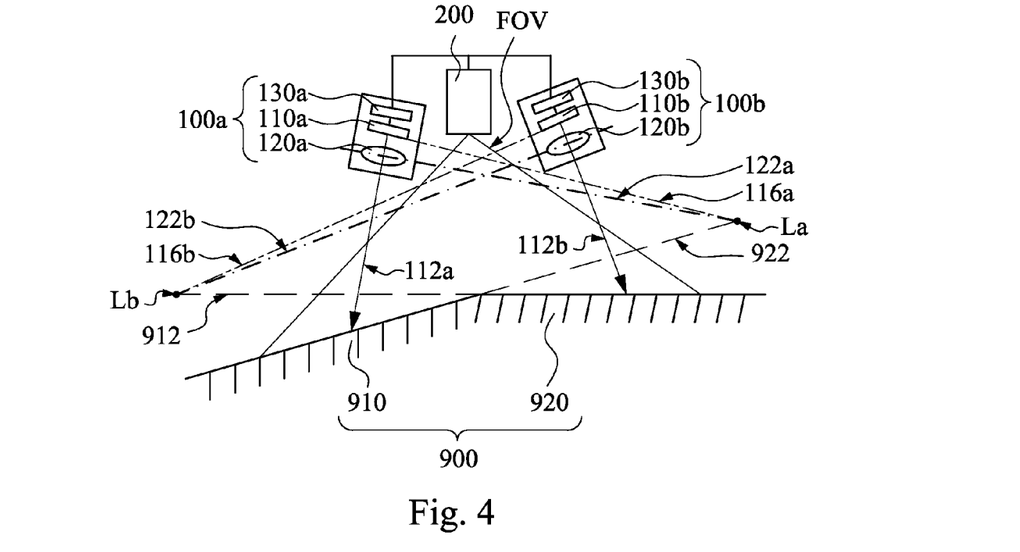
FIG. 4 is a schematic diagram of an optical system and a plane according to a second embodiment of the present invention.

FIG. 4 is a schematic diagram of an optical system and a plane 900 according to a second embodiment of the present invention. In this embodiment, the optical system includes two optical apparatuses 100a and 100b which have the same structures as the optical apparatus 100 of FIG. 1. For clarity, the light sources of the optical apparatuses 100a and 100b are omitted in FIG. 4. The first projection images 112a and 112b of the optical apparatuses 100a and 100b on the plane 900 are separated from each other. This optical system can be applied to a projection system that projects images on a non-flat plane. For example, in FIG. 4, the plane 900 has two portions 910 and 920, and the top surfaces of the two portions 910 and 920 are not parallel. The first projection image 112a of the optical apparatus 100a is projected on the portion 910, and the first projection image 112b of the optical apparatus 100b is projected on the portion 920. For the optical apparatus 100a, the lens axis surface 122a, the tangent surface 922, and the extension surface 116a substantially intersect at the straight line La. For the optical apparatus 100b, the lens axis surface 122b, the tangent surface 912, and the extension surface 116b substantially intersect at the straight line Lb. Therefore, both of the optical apparatuses 100a and 100b provide clear images on the plane 900.

In some embodiments, the optical system can further include an image capturing device 200 disposed between the two optical apparatuses 100a and 100b and connected to the tuning devices 130a and 130b. The field of view FOV of the image capturing device 200 can cover the first projection images 112a and 112b on the plane 900 to capture both of the first projection images 112a and 112b. After analyzing the detected first projection images 112a and 112b, the image capturing device 200 can send order to the tuning devices 130a and 130b to tune the positions and the tilt angles thereof. Other relevant structural details of the second embodiment are all the same as the first embodiment, and, therefore, a description in this regard will not be repeated hereinafter.

Figure 5:
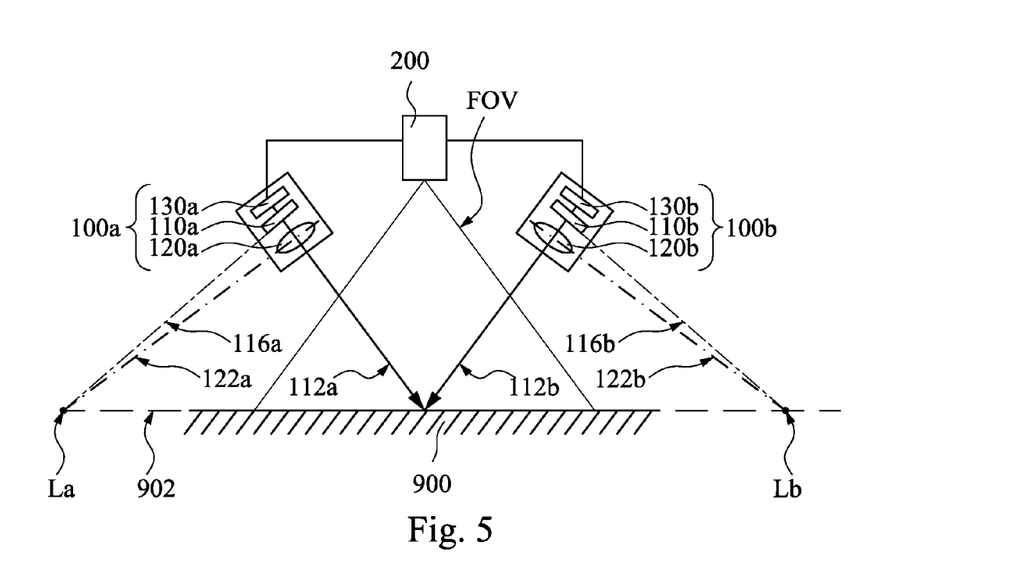
FIG. 5 is a schematic diagram of an optical system and a plane according to a third embodiment of the present invention.

FIG. 5 is a schematic diagram of an optical system and a plane 900 according to a third embodiment of the present invention. In this embodiment, the optical system includes two optical apparatuses 100a and 100b which have the same structures as the optical apparatus 100 of FIG. 1. For clarity, the light sources of the optical apparatuses 100a and 100b are omitted in FIG. 5. The first projection images 112a and 112b of the optical apparatuses 100a and 100b are overlapped on the plane 900. For example, the optical apparatuses 100a and 100b can respectively project the first projection images 112a and 112b on the same position of the plane 900 along different directions. For the optical apparatus 100a, the lens axis surface 122a, the tangent surface 902, and the extension surface 116a substantially intersect at the straight line La. For the optical apparatus 100b, the lens axis surface 122b, the tangent surface 902, and the extension surface 116b substantially intersect at the straight line Lb. Therefore, both of the optical apparatuses 100a and 100b provide clear images on the plane 900.

In some embodiments, the optical system can further include an image capturing device 200 disposed between the two optical apparatuses 100a and 100b and connected to the tuning devices 130a and 130b. The field of view FOV of the image capturing device 200 can cover the first projection images 112a and 112b on the plane 900 to capture both of the first projection images 112a and 112b. After analyzing the detected first projection images 112a and 112b, the image capturing device 200 can send order to the tuning devices 130a and 130b to tune the positions and the tilt angles thereof. Other relevant structural details of the third embodiment are all the same as the first embodiment, and, therefore, a description in this regard will not be repeated hereinafter.

Figure 6:
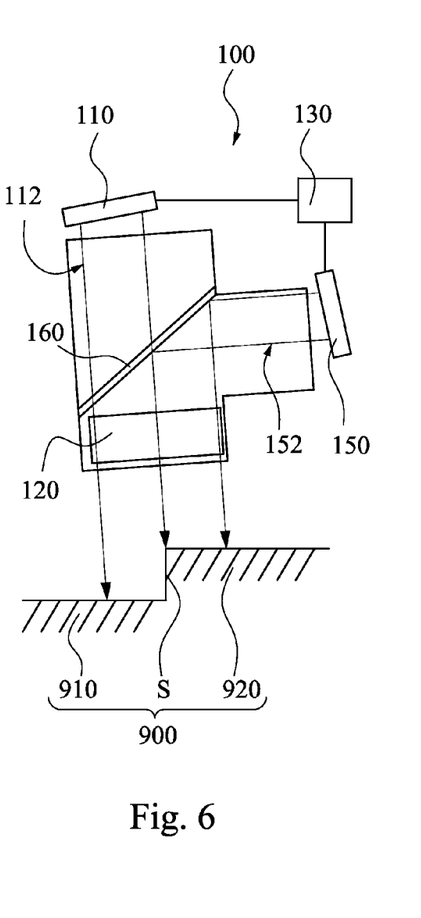
FIGS. 6 to 8 are schematic diagrams of optical systems and planes according to a fourth to a sixth embodiments of the present invention.
Figure 7:
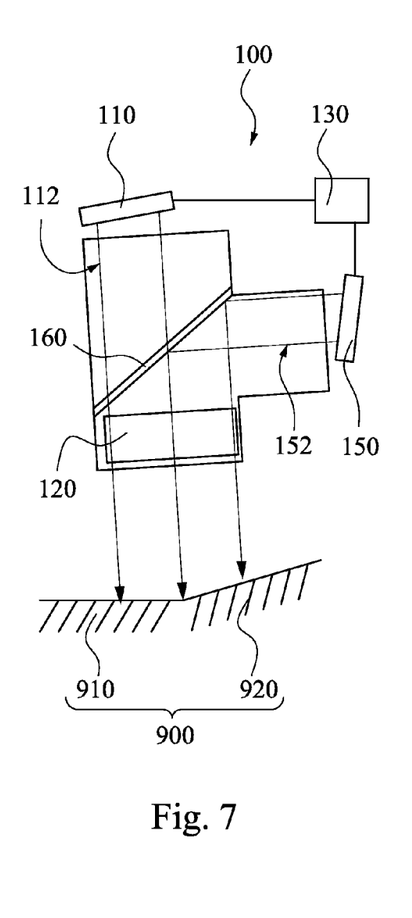
Figure 8:
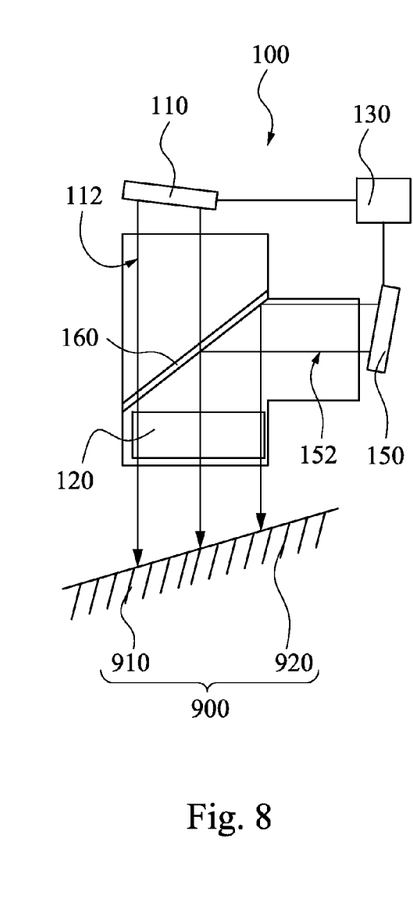

FIGS. 6 to 8 are schematic diagrams of optical systems and planes 900 according to a fourth to a sixth embodiments of the present invention. For clarity, the light sources of the optical apparatuses 100 are omitted in FIGS. 6 to 8. In these three embodiments, each of the optical apparatuses 100 further includes a second image device 150 and a beam splitter 160. The second image device 150 is configured for forming a second projection image 152. The lens group 120 is further configured for projecting the second projection image 152 to the plane 900. The beam splitter 160 is disposed between the first image device 110 and the lens group 120 for reflecting the second projection image 152 that is formed by the second image device 150 to the lens group 120 and allowing the first projection image 112 to pass therethrough. In other words, the first projection image 112 and the second projection image 152 are coaxial in design.

More specifically, the plane 900 has two portions 910 and 920. The first projection image 112 and the second projection image 152 are respectively projected on the top surfaces of these two portions 910 and 920. The top surfaces of these two portions 910 and 920 may have different morphologies, and the tuning devices 130 can respectively tune the positions and the tilt angles of the first image device 110 and the second image device 150 to simultaneously get the clear first projection image 112 and second projection image 152 on the plane 900.

As shown in FIG. 6, the plane 900 has a step S, and the top surface of the portion 920 is higher than that of the portion 910. The first image device 110 projects the first projection image 112 on the portion 910 while the second image device 150 projects the second projection image 152 on the portion 920. Therefore, the first image device 110 and the second image device 150 can be individually tuned to get an overall clear image on the plane 900. In other words, the optical apparatus 100 is adapted to the plane 900 having high height difference.

As shown in FIG. 7, the top surfaces of the portions 910 and 920 are non-parallel. As shown in FIG. 8, the top surfaces of the portions 910 and 920 are inclined. In these two embodiments, the first image device 110 can project the first projection image 112 on the portion 910 while the second image device 150 projects the second projection image 152 on the portion 920. Therefore, the first image device 110 and the second image device 150 can be individually tuned by the tuning device 130 to get an overall clear image on the plane 900. Other relevant structural details of the fourth to the sixth embodiments are all the same as the first embodiment, and, therefore, a description in this regard will not be repeated hereinafter.

Figure 9:
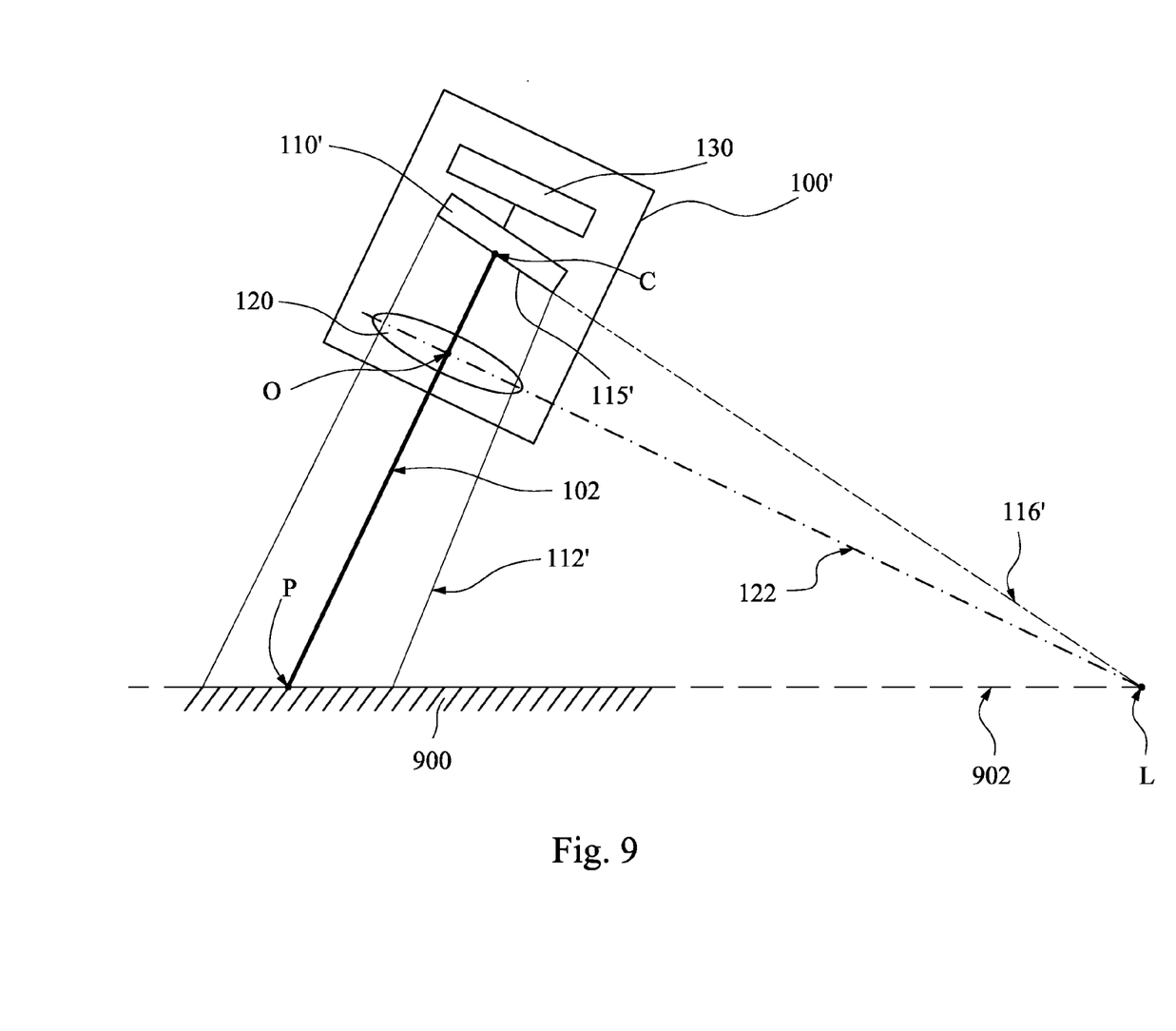
FIG. 9 is a schematic diagram of an optical system and a plane according to a seventh embodiment of the present invention.

FIG. 9 is a schematic diagram of an optical system and a plane 900 according to a seventh embodiment of the present invention. The difference between the seventh embodiment and the first embodiment mainly pertains to the first image device. In this embodiment, the optical apparatus 100' is configured for detecting the first detected image 112' of the plane 900. More specifically, the first image device 110' is configured for detecting a first detected image 112' of the plane 900 through the lens group 120.

In this embodiment, the optical apparatus 100' is a camera. The first image device 110 can be an image sensing device, such as a photodiode array. The first image device 110' is disposed at the image side of the lens group 120, and the plane 900 is located at the object side of the lens group 120. An object at the intersecting point P of the plane 900 images at the image center C of the image surface 115.

According to the explanation of FIG. 2 and reversibility principle of light, once the lens axis surface 122, the tangent surface 902, and an extension surface 116' of the image surface 115' substantially intersect at the straight line L, overall the first detected image 112' in this embodiment can be simultaneously focused on the image surface 115' of the first image device 110'. Therefore, the first image device 110' can obtain a clear first detected image 112'. Other relevant structural details of the seventh embodiment are all the same as the first embodiment, and, therefore, a description in this regard will not be repeated hereinafter.

Figure 10:
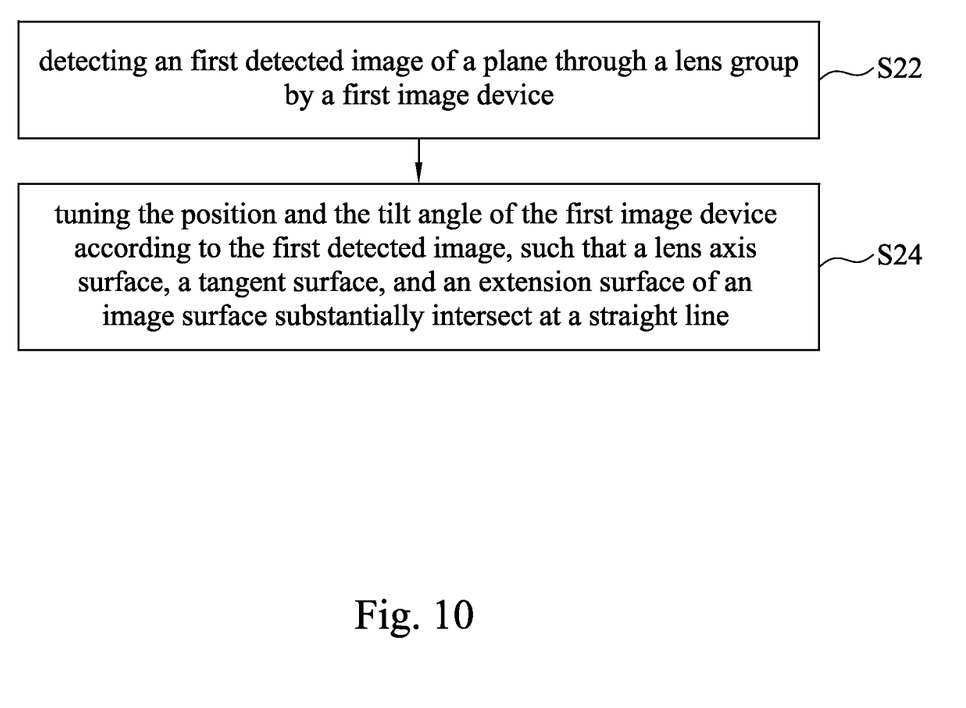
FIG. 10 is a flow chart of the method for compensating image according to one embodiment of the present invention.

To get the clear first detected image 112', a method for compensating image of the optical apparatus 100' can be applied. FIG. 10 is a flow chart of the method for compensating image according to one embodiment of the present invention. To facilitate a clear description of the image compensating method, the image compensating method is applied to, but should not be limited to, the optical apparatus 100' of FIG. 9. As shown in act S22, the first detected image 112' of the plane 900 is detected through the lens group 120 by the first image device 110'. More specifically, the first image device 110' can detect (capture) and analyze the first detected image 112' on the plane 900 to figure out if the first detected image 112' is focused on the image surface 115' of the first image device 110'.

Then, as shown in act S24, the position and the tilt angle of the first image device 110' is tuned according to the first detected image 112', such that the lens axis surface 122, the tangent surface 902, and the extension surface 116' substantially intersect at the straight line L. In some embodiments, the first image device 110' is mechanically tuned if the tuning device 130 is a tuning mechanism. For example, a user can manually rotate the focusing mechanism to tune the first image device 110'. In some embodiments, the first image device 110' is electrically tuned if the tuning device 130 is an electric device. For example, the first image device 110' itself can feedback order to the tuning device 130 to tune the first image device 110'.

In conclusion, by tuning the position and the tilt angle of the first image device 110, the lens axis surface 122, the tangent surface 902, and the extension surface 116' of the image surface 115' substantially intersect at the straight line L. Therefore, overall the first detected image 112' can be focused on the image surface 115' of the first image device 110'.

Figure 11:
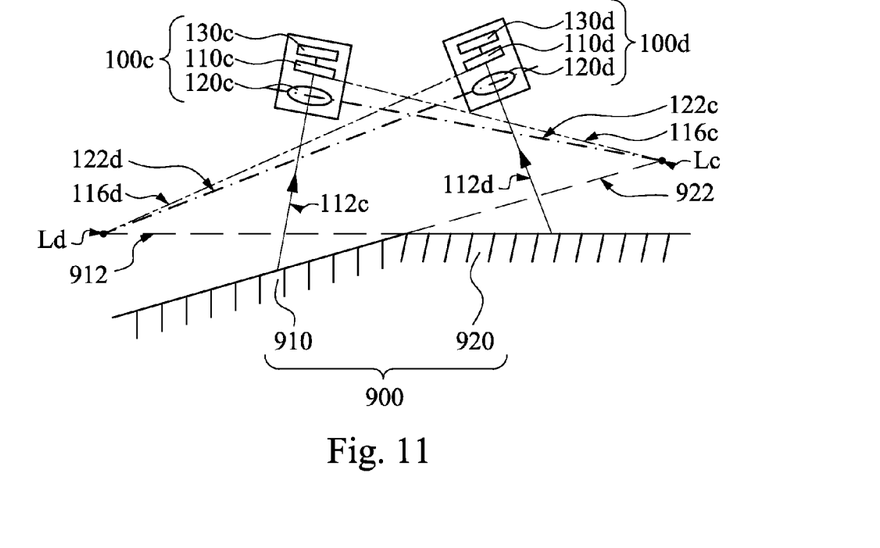
FIG. 11 is a schematic diagram of an optical system and a plane according to an eighth embodiment of the present invention.

FIG. 11 is a schematic diagram of an optical system and a plane 900 according to an eighth embodiment of the present invention. In this embodiment, the optical system includes two optical apparatuses 100c and 100d which have the same structures as the optical apparatus 100' of FIG. 9. The first detected images 112c and 112d respectively detected by the optical apparatuses 100c and 100d are separated from each other. This optical system can be applied to an image detecting system that detects images on a non-flat plane. For example, in FIG. 11, the plane 900 has two portions 910 and 920, and the top surfaces of the two portions 910 and 920 are not parallel. The optical apparatuses 100c detects the first detected image 112c on the portion 910, and the optical apparatuses 100d detects the first detected image 112d on the portion 920. For the optical apparatus 100c, the lens axis surface 122c, the tangent surface 902c, and the extension surface 116c substantially intersect at the straight line Lc. For the optical apparatus 100d, the lens axis surface 122d, the tangent surface 902d, and the extension surface 116d substantially intersect at the straight line Ld. Therefore, both of the optical apparatuses 100c and 100d detect clear images of the plane 900. Other relevant structural details of the eighth embodiment are all the same as the seventh embodiment, and, therefore, a description in this regard will not be repeated hereinafter.

Figure 12:
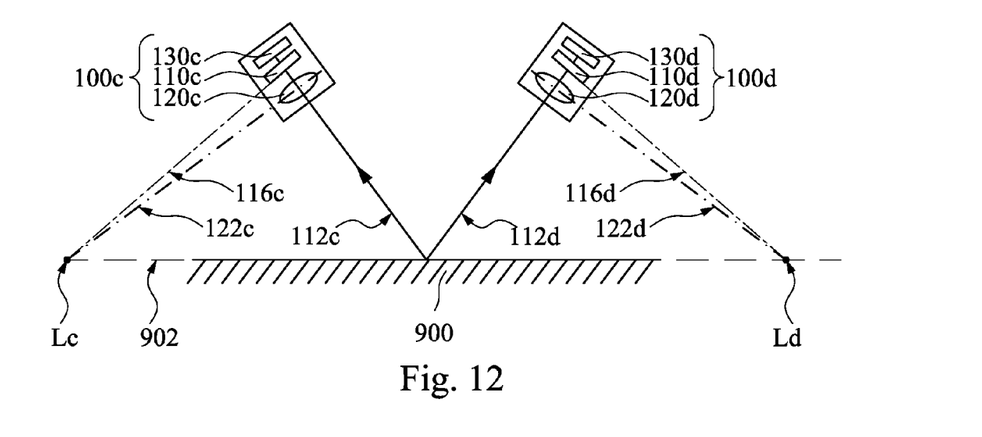
FIG. 12 is a schematic diagram of an optical system and a plane according to a ninth embodiment of the present invention.

FIG. 12 is a schematic diagram of an optical system and a plane 900 according to a ninth embodiment of the present invention. In this embodiment, the optical system includes two optical apparatuses 100c and 100d which have the same structures as the optical apparatus 100' of FIG. 9. The first detected images 112c and 112d on the plane 900 are overlapped. For example, the optical apparatuses 100c and 100d can respectively detect the same position of the plane 900 along different directions. For the optical apparatus 100c, the lens axis surface 122c, the tangent surface 902, and the extension surface 116c substantially intersect at the straight line Lc. For the optical apparatus 100d, the lens axis surface 122d, the tangent surface 902, and the extension surface 116d substantially intersect at the straight line Ld. Therefore, both of the optical apparatuses 100c and 100d detects clear images of the plane 900. Other relevant structural details of the ninth embodiment are all the same as the seventh embodiment, and, therefore, a description in this regard will not be repeated hereinafter.

Figure 13:
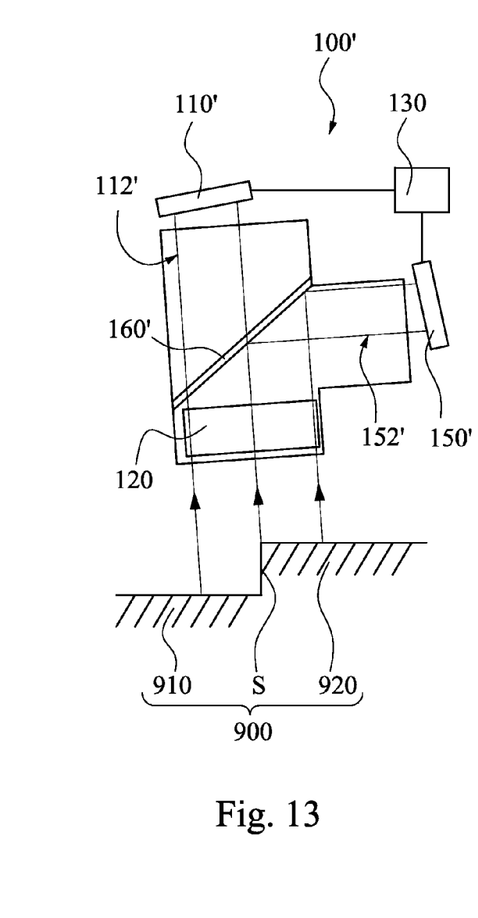
FIGS. 13 to 15 are schematic diagrams of optical systems and planes according to a tenth to a twelfth embodiments of the present invention.
Figure 14:
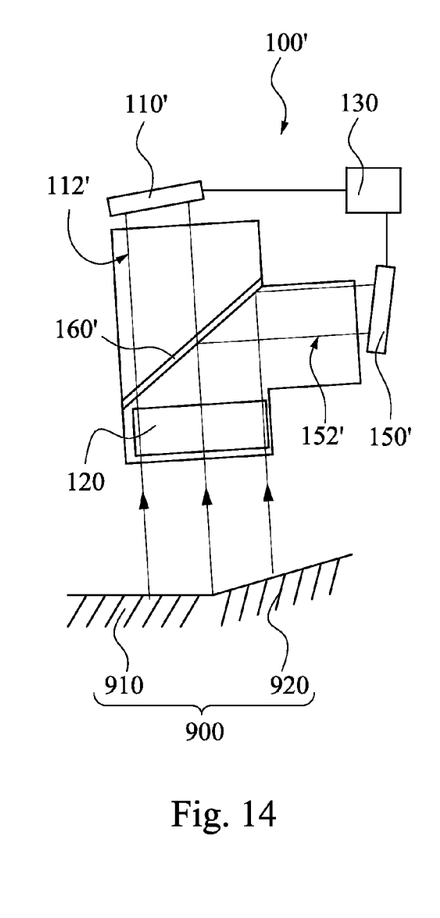
Figure 15:
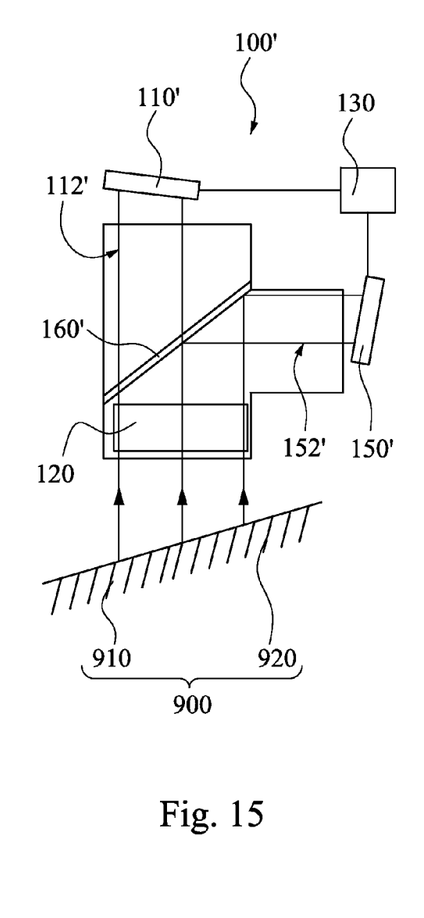

FIGS. 13 to 15 are schematic diagrams of optical systems and planes 900 according to a tenth to a twelfth embodiments of the present invention. In these three embodiments, each of the optical apparatuses 100' further includes a second image device 150' and a beam splitter 160'. The second image device 150' is configured for detecting a second detected image 152'. The beam splitter 160' is disposed between the first image device 110' and the lens group 120 for reflecting the second detected image 152' from the lens group 120 to the second image device 150' and allowing the first detected image 112' to pass therethrough. In other words, the first detected image 112' and the second detected image 152' are coaxial in design.

More specifically, the plane 900 has two portions 910 and 920. The first image device 110' and the second image device 150' respectively detect the top surfaces of these two portions 910 and 920. The top surfaces of these two portions 910 and 920 may have different morphologies, and the tuning devices 130 can respectively tune the positions and the tilt angles of the first image device 110' and the second image device 150' to simultaneously get the clear first detected image 112' and second detected image 152' on the plane 900.

As shown in FIG. 13, the plane 900 has a step S, such that the top surfaces of the portions 910 and 920 have height difference. As shown in FIG. 14, the top surfaces of the portions 910 and 920 are non-parallel. As shown in FIG. 15, the top surfaces of the portions 910 and 920 are inclined. In these three embodiments, the first image device 110' can detect the first detected image 112' on the portion 910 while the second image device 150' detects the second detected image 152' on the portion 920. Therefore, the first image device 110' and the second image device 150' can be individually tuned to obtain an overall clear image on the plane 900. Other relevant structural details of the tenth to the twelfth embodiments are all the same as the seventh embodiment, and, therefore, a description in this regard will not be repeated hereinafter.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical system, comprising:
    at least one optical apparatus for projecting a first projection image to a plane, the optical apparatus comprising:
    a first image device having an image surface, wherein the image surface has an image center;
    a lens group disposed between the first image device and the plane and having a lens axis surface and an optic center, wherein the optic center and the image center form a connection line, and the plane has a tangent surface to an intersecting point of the connection line, wherein the lens axis surface, the tangent surface, and an extension surface of the image surface substantially intersect at a straight line;
    a second image device for forming a second projection image, wherein the lens group is further for projecting the second projection image to the plane;
    a beam splitter disposed between the first image device and the lens group for reflecting the second projection image formed by the second image device to the lens group and allowing the first projection image to pass therethrough; and
    a tuning device connected to the first image device for tuning a position and a tilt angle of the first image device.

2. The optical system of claim 1, wherein the at least one optical apparatus is for projecting the first projection image to the plane, and the optical system further comprises:
    an image capturing device connected to the tuning device for capturing the first projection image on the plane.

3. The optical system of claim 1, wherein the first image device is a digital micromirror device.

4. The optical system of claim 1, wherein the optical apparatus further comprises:
    a light source for providing a light beam, wherein the first image device modulates the light beam to form the first projection image.

5. The optical system of claim 1, wherein the tuning device is further connected to the second image device for tuning a position and a tilt angle of the second image device.

6. The optical system of claim 1, wherein a number of the optical apparatus is plural, and the first projection images of the optical apparatuses on the plane are separated from each other.

7. The optical system of claim 1, wherein a number of the optical apparatus is plural, and the first projection images of the optical apparatuses overlap on the plane.

8. A method for compensating image of an optical apparatus, wherein the optical apparatus includes first image device, a second image device, and a lens group, the first image device has an image surface having an image center, the lens group has a lens axis surface and an optic center, the optic center and the image center form a connection line, the method comprises:
    forming a first image by the first image device;
    forming a second image by the second image device;
    reflecting the second image to the lens group by a beam splitter and allowing the first image to pass through the beam splitter;
    projecting the first image to a plane through the lens group, wherein the plane has a tangent surface to an intersecting point of the connection line;
    projecting the second image to the plane through the lens group;
    detecting the first image projected on the plane; and
    tuning a position and a tilt angle of the first image device according to the detected first image, such that the lens axis surface, the tangent surface, and an extension surface of the image surface substantially intersect at a straight line.

9. The method of claim 8, wherein forming the first image comprises:
   providing a light beam to the first image device; and
   modulating the light beam into the first image by the first image device.

10. The method of claim 8, wherein tuning the first image device comprises:
    electrically tuning the position and the tilt angle of the first image device.

11. The method of claim 8, wherein tuning the first image device comprises:
    mechanically tuning the position and the tilt angle of the first image device.

12. A method for compensating image of an optical apparatus, wherein the optical apparatus includes a first image device, a second image device, and a lens group, the first image device has an image surface having an image center, the lens group has a lens axis surface and an optic center, the optic center and the image center form a connection line, the method comprises:
    detecting a first image of a plane through the lens group by the first image device, wherein the plane has a tangent surface to an intersecting point of the connection line;
    reflecting a second image of the plane to the second image device through the lens group and by a beam splitter, wherein the first image passes through the beam splitter; and
    tuning a position and a tilt angle of the first image device according to the detected first image, such that the lens axis surface, the tangent surface, and an extension surface of the image surface substantially intersect at a straight line.

13. The method of claim 12, wherein tuning the first image device comprises:
    electrically tuning the position and the tilt angle of the first image device.

14. The method of claim 12, wherein tuning the first image device comprises:
    mechanically tuning the position and the tilt angle of the first image device.

15. An optical system, comprising:
    at least one optical apparatus comprising:
    a first image device for detecting a first detected image of a plane and having an image surface, wherein the image surface has an image center;
    a lens group disposed between the first image device and the plane and having a lens axis surface and an optic center, wherein the optic center and the image center form a connection line, and the plane has a tangent surface to an intersecting point of the connection line, wherein the lens axis surface, the tangent surface, and an extension surface of the image surface substantially intersect at a straight line;
    a second image device for detecting a second image of the plane through the lens group;
    a beam splitter disposed between the first image device and the lens group for reflecting the second detected image from the lens group to the second image device and allowing the first detected image to pass therethrough; and
    a tuning device connected to the first image device for tuning a position and a tilt angle of the first image device.

16. The optical system of claim 15, wherein the first image device is a photodiode array.

17. The optical system of claim 15, wherein the tuning device is further connected to the second image device for tuning a position and a tilt angle of the second image device.

18. The optical system of claim 15, wherein a number of the optical apparatus is plural, and the first detected images of the optical apparatuses on the plane are separated from each other.

19. The optical system of claim 15, wherein a number of the optical apparatus is plural, and the first detected images of the optical apparatuses overlap on the plane.

\* \* \* \* \*